United States Patent
Hwang et al.

(10) Patent No.: US 9,092,167 B2
(45) Date of Patent: Jul. 28, 2015

(54) SYSTEMS AND METHODS FOR MANAGING A PRINT JOB

(75) Inventors: Peter G. Hwang, Vancouver, WA (US); William E. Hertling, Vancouver, WA (US); Saara Eeva Helena Kamppari, Vancouver, WA (US); Matthew Ryan Bonner, Vancouver, WA (US); David Berfanger, Vancouver, WA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 135 days.

(21) Appl. No.: 13/079,470

(22) Filed: Apr. 4, 2011

(65) Prior Publication Data

US 2012/0250076 A1 Oct. 4, 2012

(51) Int. Cl.
*G06F 3/12* (2006.01)

(52) U.S. Cl.
CPC .............. *G06F 3/1206* (2013.01); *G06F 3/126* (2013.01); *G06F 3/1288* (2013.01); *G06F 3/1228* (2013.01); *G06F 3/1259* (2013.01)

(58) Field of Classification Search
CPC ...... G06F 3/1259; G06F 3/1232; G06F 3/126
USPC .............................. 358/1.15, 1.13, 1.14; 399/8
See application file for complete search history.

(56) References Cited

U.S. PATENT DOCUMENTS

| | | | |
|---|---|---|---|
| 5,699,460 A | 12/1997 | Kopet et al. | |
| 6,003,065 A | 12/1999 | Yan et al. | |
| 6,052,198 A * | 4/2000 | Neuhard et al. | 358/1.15 |
| 6,201,611 B1 | 3/2001 | Carter et al. | |
| 6,324,545 B1 | 11/2001 | Morag | |
| 6,529,214 B1 | 3/2003 | Chase et al. | |
| 6,636,891 B1 | 10/2003 | LeClair et al. | |
| 6,975,419 B2 * | 12/2005 | Staas et al. | 358/1.15 |
| 6,977,743 B2 | 12/2005 | Carlton | |
| 7,268,921 B2 | 9/2007 | Eguchi et al. | |
| 7,271,922 B2 * | 9/2007 | Yamashita | 358/1.1 |
| 7,283,272 B2 | 10/2007 | Johnson et al. | |
| 7,321,437 B2 | 1/2008 | Parry | |
| 7,366,758 B2 | 4/2008 | Kasatani | |
| 7,408,667 B2 | 8/2008 | Ferlitsch | |
| 7,409,434 B2 | 8/2008 | Lamming et al. | |
| 7,443,523 B2 | 10/2008 | Leone, III et al. | |
| 7,474,423 B2 | 1/2009 | Garcia et al. | |
| 7,538,899 B2 | 5/2009 | Kawaoka | |
| 7,599,083 B2 | 10/2009 | Reese et al. | |

(Continued)

OTHER PUBLICATIONS

Klensin, J. "Simple Mail Transfer Protocol," Request for Comments: 5821, Network Working Group, Oct. 2008, <http://tools.ietf.org/html/ric5321>.

(Continued)

*Primary Examiner* — Benjamin O Dulaney (57) ABSTRACT

One example discloses a network system for managing a print job. The network system can comprise a printing system. The printing system can comprise a memory for storing computer executable instructions and a processing unit for accessing the memory and executing the computer executable instructions. The computer executable instructions can comprise a printer server to generate a print job for a printer based on a received print email message. The print job can be generated based on an email decoration in the print email message. The email decoration can include a request specifying printing parameters for the print job.

21 Claims, 7 Drawing Sheets

(56) References Cited

U.S. PATENT DOCUMENTS

| | | | |
|---|---|---|---|
| 7,634,541 | B2 | 12/2009 | Chen et al. |
| 7,663,674 | B2 | 2/2010 | Billerbeck |
| 7,711,832 | B1 | 5/2010 | Champion et al. |
| 7,779,108 | B2 | 8/2010 | Kawai |
| 7,783,706 | B1 | 8/2010 | Robinson |
| 7,800,775 | B2 | 9/2010 | Ono et al. |
| 7,924,452 | B2 | 4/2011 | Matsuda |
| 8,095,376 | B2 | 1/2012 | Gombert et al. |
| 8,248,647 | B2* | 8/2012 | Izaki .......................... 358/1.15 |
| 8,610,921 | B2 | 12/2013 | Miyake |
| 8,624,989 | B2 | 1/2014 | Carpio et al. |
| 8,639,760 | B2* | 1/2014 | Konsella et al. ............ 709/206 |
| 2001/0019425 | A1* | 9/2001 | Yamashita ................. 358/1.15 |
| 2001/0040693 | A1* | 11/2001 | Saito et al. ................. 358/1.15 |
| 2002/0002590 | A1* | 1/2002 | King et al. .................. 709/206 |
| 2002/0191210 | A1 | 12/2002 | Staas et al. |
| 2002/0191211 | A1 | 12/2002 | Miller et al. |
| 2003/0067625 | A1 | 4/2003 | Kim |
| 2003/0163575 | A1 | 8/2003 | Perkins et al. |
| 2003/0225894 | A1 | 12/2003 | Ito |
| 2004/0114181 | A1 | 6/2004 | Kim |
| 2004/0137919 | A1 | 7/2004 | Biundo |
| 2004/0143651 | A1 | 7/2004 | Allen et al. |
| 2004/0167974 | A1 | 8/2004 | Bunn et al. |
| 2004/0196492 | A1* | 10/2004 | Johnson et al. ............ 358/1.15 |
| 2004/0227960 | A1 | 11/2004 | Farros et al. |
| 2005/0005003 | A1 | 1/2005 | Maekawa |
| 2005/0049837 | A1 | 3/2005 | Reese et al. |
| 2005/0132028 | A1 | 6/2005 | Lester et al. |
| 2005/0132094 | A1 | 6/2005 | Wu |
| 2005/0138137 | A1 | 6/2005 | Encarnacion et al. |
| 2005/0198572 | A1 | 9/2005 | Quiller et al. |
| 2005/0270569 | A1 | 12/2005 | Hayashi |
| 2007/0050447 | A1 | 3/2007 | Oikarinen |
| 2007/0050456 | A1 | 3/2007 | Vuong et al. |
| 2007/0213972 | A1 | 9/2007 | Schejter et al. |
| 2007/0271347 | A1 | 11/2007 | Logue et al. |
| 2008/0037062 | A1 | 2/2008 | Omino et al. |
| 2009/0002770 | A1 | 1/2009 | Cavill et al. |
| 2009/0086254 | A1 | 4/2009 | Duong |
| 2009/0089128 | A1 | 4/2009 | Tkatch et al. |
| 2009/0157859 | A1 | 6/2009 | Morris |
| 2010/0328707 | A1* | 12/2010 | Miyake ........................ 358/1.15 |
| 2011/0106729 | A1 | 5/2011 | Billingsley et al. |
| 2011/0231782 | A1 | 9/2011 | Rohrabaugh et al. |
| 2012/0084365 | A1 | 4/2012 | McCann, Jr. |
| 2012/0239726 | A1 | 9/2012 | Berfanger et al. |
| 2012/0250074 | A1 | 10/2012 | Kamppari et al. |
| 2012/0297026 | A1 | 11/2012 | Polis et al. |
| 2013/0063774 | A1 | 3/2013 | Nuggehalli et al. |
| 2013/0083045 | A1 | 4/2013 | Berfanger |
| 2013/0308165 | A1 | 11/2013 | Venkatesh et al. |
| 2013/0321860 | A1* | 12/2013 | Koshigaya, Motoki ..... 358/1.15 |
| 2014/0022585 | A1 | 1/2014 | Cogan |

OTHER PUBLICATIONS

Resnick Ed., P., "Internet Message Format," Request for Comments: 5322, Network Working Group, Oct. 2008, <http://tools.ietf.org/html/rfc5322>.
Stein, R., "2 hidden ways to get more from your Gmail address," Official Gmail Blog, Mar. 5, 2008, <http://gmailblog.blogspot.com/2008/03/2-hidden-ways-to-get-more-from-your.html>.
Berners-Lee. T. et al., "Uniform Rosouroe Identifier (URI): Generic Syntax," RFC 3986, Internet Engineering Task Force, 2005.
Fielding. R. et al., "Hypertext Transfer Protocol —HTTP/1.1."RFC 2616, Internet Engineering Task Force, 1999.
Fielding, Roy Thomas, "Architectural Styles and the Design of Network-based Software Architectures," [Doctoral Dissertation, 2000], HTML version retrieved on May 7, 2010 from http://www.ics.uci.edul~fielding/pubs/dissertation/top.htm.
Hastings, S. et al., "Image Processing for the Grid: A Toolkit for Building Grid-enabled Image Processing Applications," IEEE/ACM International Symposium, May 2003.
Hemalatha, T. et al., "Dynamic Web Service Based Image Processing System," ADCOM, IEEE 2008.
Keiser, K. et al., "Distributed Services Technology for Earth Science Data Processing," Information Technology and Systems Center, University of Alabama, Huntsville, 2003.
Liang, Y. et al., "An Efficient Image Processing Method Based on Web Services for Mobile Devices," CISP, IEEE 2009.
Miri, M. et al., "A Web-Based Framework for Distributed Medical Image Processing Using Image Markup Language (IML)," 2009 Third UK Sim European Symposium on Computer Modeling Simulation, IEEE 2009, pp. 470-475.
POSTEL J. et al., "File Transfer Protocol," Request for Comments 959, Internet Engineering Task Force, 1985.
Hewlett-Packard Co.. "How to Enable HP Web Services and Configure HP ePrint," Mar. 18, 2011, <https://h30495.www3.hp.com/static/downloads/les/Mac_ePrint_configure_M4555.pdf>.
Hewlett-Packard Co., "HP ePrint," 2010, (Datasheet),<http://www.hp.com/hpinfo/newsroom/press_kits/2010/InnovationSommit/ePrint_Datasheetpdf>.
Richard Lai, "HP ePrint really works: eMails and attachments printed from the cloud (video)," Jul. 2, 2010, <http://www.engadget.com/2010/07/02/hp-eprint-really-works-emails-and-attachments-printed-from-the/>.
Daniel Adams, "30 Brilliant Web-based Photo Editors," Jan. 23, 2009, <http://www.instantshift.com/2009/01/23/30-brilliant-web-based-photo-editors/>.
Dave Weiner, "remotemagick: An XML-RPC web service API on top of the ImageMagick suite of tools,"Apr. 6, 2010, <http://web.archive.org/web/20100406234500/http://code.google.com/p/remotemagick/>.
Erenkrantz et al., "CREST: A new model for Decentralized, Internet-Scale Applications," Sep. 2009, ISR Technical Report # UCI-ISR-09-4, <https://isr.uci.edu/sites/isr.uci.edu/files/techreports/UCI-ISR-09-4.pdf>.
Fielding, et al., "Header Field Definitions," Mar. 1, 2011, RFC 2616, <http://web.archive.org/web/20110301103546/http://www.w3.org/Protocols/rfc2616/rfc261.
Gijs van Tulder, "PHP Frontend to ImageMagick.," Aug. 4, 2003, <http://www.devarticles.com/c/a/PHP/PHP-Frontend-to-ImageMagick/>.
Hewlett-Packard Development Company, L.P., "App Developers Private Beta," Apr. 16, 2010, <http://web.archive.org/web/20100416210403/http://h30495.www3.hp.com/developers?>.
James Clark et al., eds., "XML Path Language (XPath), Verision 1.0," Nov. 1999, <http://www.w3.org/TR/Xpath22 .
John Fronckowiak, "Processing Images with Amazon Web Services," Sep. 21, 2008, <https://aws.amazon.com/items/1602?externalID=1602>.
M. Sipser, "Pushdown Automata," Introduction to the Theory of Computation, 2 ed., 2006, Chap. 2, section 2.2, pp. 109-123, Thompson Course Technology.
N. Alameh. "A Raster Image Re-Projection Web Service Prototype," 2004, Photo. Eng. Rem. Sens. 70(5), 635-642 (2004).
Nathan Moroney, "Local Color Correction Using Non-Linear Masking," 2000, Proceedings of IS&T/SID 8th Color Imaging Conference:Color Science and Engineering Systems, Technologies, Applications. pp. 108-111 (2000).
E. Gardner, New Business Models, Interview 2.0, "Peecho uses the cloud to turn your digital publication into print," Lean Back 2.0, Jun. 17, 2012, pp. 1-5, The Economist Newspaper Limited 2013, Available at: <economistgroup.com/leanback/new-business-models/peecho-uses-the-cloud-to-turn-your-digital-publication-into-print/>.
Google Cloud Print, 2013, pp. 1-10, Available at: <support.google.com/cloudprint/?hl=en>.
Hewlett-Packard Development Company: L.P., "HP ePrintCenter," Aug. 14, 2010, <http://web.archive.org/web/20100814024025/http://h30495.www3.hp.com/about/eprint?>.
Jason Hamilton, "Adding the Quick Print Button to Outlook 2010," Jan. 22, 2011, <https://www.404techsupport.com/2011/01/adding-the-quick-print-button-to-outlook-2010/>.
Wikipedia, "Internet Message Access Protocol," Dec. 29, 2010, <http://en.wikipedia.org/w/index.php?title=Internet_Message_Access_Protocol&oldid=404727437>.

\* cited by examiner

| MESSAGE HEADER |
| --- |
| FROM: SENDER@EXAMPLE.COM<br>TO: PRINTER@EXAMPLE.COM<br>SUBJECT: SUBJECT TEXT #[FIRST]/DUPLEX/COLOR #[SECOND]/DUPLEX/DRAFT/BLACKANDWHITE |
| MESSAGE BODY |
| BODY OF MESSAGE |
| ATTACHED FILE 1 |
| FILE1.DOC |
| ATTACHED FILE 2 |
| FILE2.DOC |

| MESSAGE HEADER |
| --- |
| FROM: SENDER@EXAMPLE.COM |
| TO: PRINTER #IGNORE_REQUESTS@EXAMPLE.COM |
| SUBJECT: SUBJECT TEXT #DUPLEX #COLOR |
| MESSAGE BODY |
| BODY OF MESSAGE |

| MESSAGE HEADER |
| --- |
| DECORATION: #PRINT_BODY |
| FROM: SENDER@EXAMPLE.COM |
| TO: PRINTER@EXAMPLE.COM |
| SUBJECT: SUBJECT TEXT |
| MESSAGE BODY |
| BODY OF MESSAGE |
| ATTACHED FILE |
| FILE1.DOC |

| MESSAGE HEADER |
| --- |
| FROM: SENDER@EXAMPLE.COM<br>TO: PRINTER@EXAMPLE.COM<br>SUBJECT: SUBJECT TEXT |
| MESSAGE BODY |
| BODY OF MESSAGE |
| ATTACHED FILE 1 |
| FILE1.DOC |
| ATTACHED FILE 2 |
| REQUESTS.TXT |

| REQUESTS.TXT |
| --- |
| [TAG] [COPIES: 2]<br><br>[TAG] [TYPE: PHOTO]<br><br>[TAG] [FILE1.DOC] [PAGES: 2, 3] |

SYSTEMS AND METHODS FOR MANAGING A PRINT JOB

BACKGROUND

Cloud computing is location-independent computing, whereby shared servers provide resources, software, and data to computers and other devices on demand. The term "cloud" is used as a metaphor for the Internet, based on the cloud drawing often used to represent computer networks. Cloud computing describes a supplement, consumption, and delivery model for information technologies services based on the Internet, and can involves over-the-Internet provision of dynamically scalable and often virtualized resources. One key characteristic of cloud computing is that the computing is "in the cloud" e.g. the processing (and the related data) is not in a specified, known or static place(s). Details are abstracted from consumers, who no longer have need for expertise in, or control over, the technology infrastructure "in the cloud" that supports them. This is in contrast to a model in which the processing takes place in one or more specific servers that are known.

In some examples of cloud computing, one or more of the aforementioned resources can include a printer, which can be referred to as a cloud printer. In such a situation, nearly any computing device connected to the computing cloud can print to the cloud printer.

DETAILED DESCRIPTION

Figure 1:
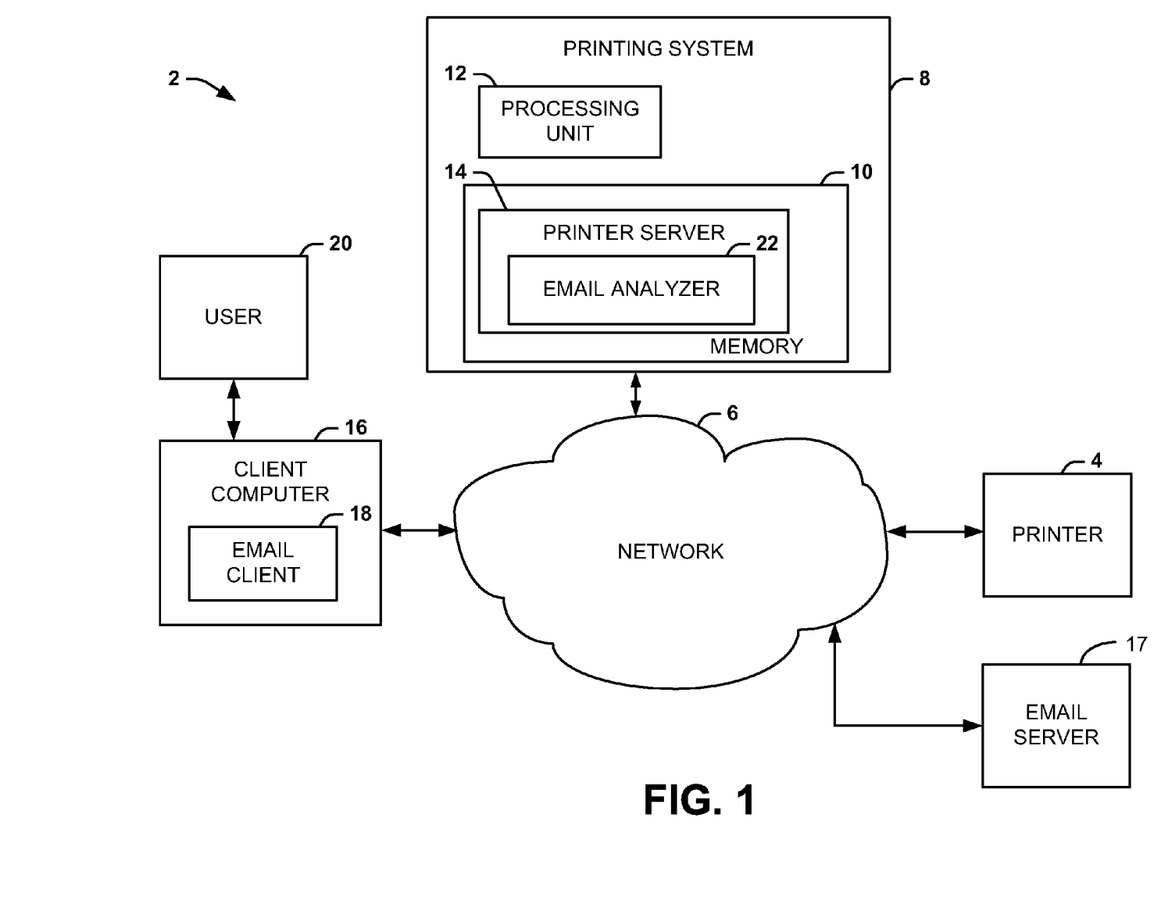
FIG. 1 illustrates an example of a network system for managing a print job.

FIG. 1 illustrates an example of a network system 2 for controlling a print job via email. The network system 2 could be implemented, for example, as a computing cloud. A printer 4 can be connected to a network 6. The network 6 can be implemented, for example, as the Internet. Nodes on the network 6 can communicate via a communications protocol, such as Transmission Control Protocol/Internet Protocol (TCP/IP), Internet Protocol version 6 (IPv6), etc. The printer 4 can be implemented as a cloud printer, wherein the printer 4 can be assigned a node address (e.g., an IP address) on the network 6. The printer 4 can be registered with a printing system 8. Moreover, in some examples, the printer 4 can be designed to provide a plurality of different selectable features, such as, but not limited to duplexing (e.g., two sided printing), color printing, multiple paper sizes.

For purposes of simplification of explanation, in the present example, different components of the network system 2 are illustrated and described as performing different functions. However, one of ordinary skill in the art will understand and appreciate that the functions of the described components can be performed by different components, and the functionality of several components can be combined and executed on a single component. The components can be implemented, for example, as software (e.g., computer executable instructions), hardware (e.g., an application specific integrated circuit), or as a combination of both (e.g., firmware). In other examples, the components could be distributing among remote devices across the network 6 (e.g., external web services).

The printing system 8 can include, for example, a memory 10 for storing computer executable instructions. The printing system 8 can also include, for example, a processing unit 12 (e.g., a processor core) for accessing the memory 10 and executing computer executable instructions. The memory 10 can include a printer server 14. As described herein, the printer server 14 can route print jobs to the printer 4 based on a received email. The printer server 14 can send network messages to the printer 4. The network messages can cause a printer 4 to process a print job (e.g., print a file). The network messages can include a payload that provides commands to the printer 4 in a protocol native to the printer 4, which can be referred to as an instruction message. For instance, the instruction message can include printer command language (PCL) commands, portable document format (PDF) commands, HEWLETT PACKARD® Graphics Language (HPGL), commands, etc. To provide the instruction message, the printer server 14 can include a printer driver for the printer 4. In some examples, the printer driver for the printer 4 could be provided to printer server 14 from an external system (e.g. a web service).

As one example, the printer server 14 can receive an email message requesting that a particular file (e.g., a text document, a photograph and/or a schematic drawing) attached to the email message be printed, which file can be referred to as an attached file and/or a portion of the email message be printed, which email message can be referred to as a print email message. The print email message can include, for example, an email decoration that specifies printing parameters for the printer 4.

As one example, to send an email across the network 6 from a client computer 16 to the printer server 14 (which email message designates the printer 4 as a destination of the email message), the client computer can connect to an email server 17. In some examples, the email server 17 could be implemented as a Simple Mail Transfer Protocol (SMTP) server. In other examples, the email server 17 could be a proprietary email server. The email server 17 can respond to the client computer 16 with an acknowledgment message. Upon receiving the acknowledgment message, the client computer 16 can provide an identity message that identifies the client computer 16. The identity message can include, for example, a client-hostname for the client computer 16. The email server 17 can respond to the identity message with another acknowledgment message. In response, the client computer 16 can identify an email address of a sender of the email message (e.g., MAIL FROM:<sender address>). The email server 17 can respond with another acknowledgment message. In response, the client computer 16 can identify an address of a recipient of the email message (e.g., "RCPT TO:<recipient address>"), and the email server can respond with another acknowledgment message. In response, the client computer 16 can provide a request to start transmitting the email message (e.g., "DATA"), and the email server 17 can respond with a message that requests that the client computer 16 start the input for the email message, and to end the input with a specific ending identifier (e.g., a carriage return, line feed, a period and another carriage return, line feed"<CRLF>.<CRLF>"). In response, the client computer 16 can provide the email message to the email server 17, including the specific ending identifier. In response, the email server 17 can provide an acknowledgment of reception the email message, and the client computer 16 can disconnect from the email server 17.

Upon receipt of the email message, the email server 17 can create an envelope for the email message by employing information provided in the address of the sender and the address of the recipient provided from the client computer 16. The envelope can have the same or different sender and recipient email addresses as the email message. For purposes of simplification of explanation, it is to be understood that the term "address field" can refer to either a field in a header of an email message, and/or as an address included in the envelope. The email server 17 can provide the envelope and the email message to a delivery agent that can examine the envelope, and provide the email message in an appropriate mailbox, such as a mailbox of the printer server 14. The printer server 14 can detect the presence of the email message in the mailbox of the printer server 14, and retrieve the email message. In this manner, the client computer 16 can provide an email message that includes the printer 4 as a recipient of the email message, and the printer server 14 can receive and process such an email message.

In FIG. 1, only one email server 17 is illustrated for purposes of simplification of explanation. However, it is to be understood that the email server 17 could be representative of a plurality of email servers 17 to facilitate the delivery of an email message. For instance, in some examples, the email server 17 can represent one or more of a mail submission agent (MSA), a mail transfer agent (MTA), a mail exchanger (MX), a mail delivery agent (MDA), etc. employed to deliver the email message. In such a situation, the MSA can initially receive an email message from a mail user agent (MUA) of a sender of the email message. The MSA can forward the email message to an associated MTA. The MTA can provide the email message to an MX associated with a recipient of the email message. The MX can provide the email message to an MDA that stores the email message in a mailbox of the recipient of the email message. The email message can be retrieved from the mailbox by an MUA of the recipient. Moreover, in some examples, some or all of the components represented as the email server 17 could be integrated into the printer server 14. For instance, in some examples, the printer server 14 can include an MUA to send and receive email messages.

The email decoration can be implemented as a request identifier followed and/or proceeded by a request. For instance, the email decoration could be implemented as an email header subject field decoration, an email address field decoration, an email header optional field decoration or as an email tag (e.g., a separate attached file or body) decoration. The email decoration can include, for example, a request that a print job be executed in a specific way. Some examples include specifying a particular size of paper to print a print job and/or a number of copies to be printed (e.g., letter, A4, photo-sized, etc.). Other examples include specifying a print quality (e.g., draft quality, black-and-white or color) for a print job, and/or printing photos. Still other examples include specifying that a particular portion of the print email message (e.g., a portion of a body of the print email message) be printed. Some examples include specifying that a particular portion (such as photographs) of the print email message be omitted in a print job (e.g., a lean print request). It is also considered that some email decorations can cause other email decorations to be ignored and/or interpreted differently. Still further, in some examples, some email decorations could identify a particular network resource and/or service (e.g., a web service) that can provide content to be printed. As yet another example, the email decoration can specify a particular method of sending a response (e.g., a confirmation or denial) email. For instance, the email decoration could specify that response emails are sent via text message to a mobile phone. Other examples can include the email decoration specifying the storing of a file that can be referenced (by another email decoration) and printed at a later time (e.g., a travel checklist).

In some examples, the email decoration can specify a user authorized to print to a particular printer, such that the user is added to a white list. Similarly, the email decoration can specify the user is not authorized to print to a particular printer, such that the user is added to a blacklist. The user can be identified, for example, by an email address included in the email decoration. In other examples, the email decoration can include a request specifying that anyone can print to the printer 4. Similarly, the email decoration can include a request that indicates that only users identified on a white list can print to the printer 4. In still other examples, the email decoration can include a request specifying that default settings of a particular printer be changed. In yet other examples, the email decoration can include a request that a list of available requests employable in an email decoration be provided. In still yet other examples, the email decoration can include a request that a list of stored print jobs be printed.

Figure 2:
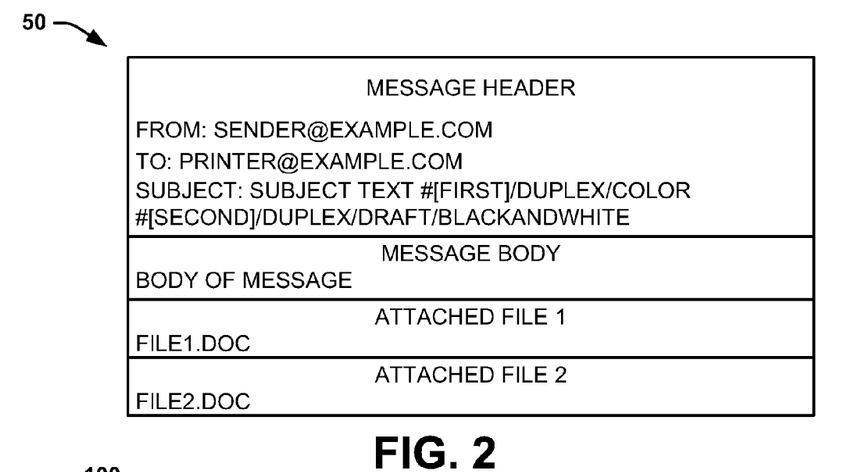
FIG. 2 illustrates an example of a print email message that includes a subject field decoration.

FIG. 2 illustrates an example of a print email message 50 that includes a subject field decoration. In FIG. 2, the print email message 50 includes a message header (labeled in FIG. 2 as "MESSAGE HEADER") that can include, for example, an identifier for the print email message 50, as well as data based on a protocol employed to send the print email message 50. The message header can also include, for example, a sender address field (labeled in FIG. 2 as "FROM") that identifies a sender of the print email message 50. The message header can further include a destination address field (labeled in FIG. 2 as "TO") that identifies an email address of a printer (e.g., the printer 4 illustrated in FIG. 1). The message header still further includes a subject field (labeled in FIG. 2 as "SUBJECT") that includes text (labeled in FIG. 2 as "SUBJECT TEXT") describing the nature of the print email message 50. The print email message 50 can also include (after the message header) a body of a message (labeled in FIG. 2 as "MESSAGE BODY"), as well as first and second attached files (labeled in FIG. 2 as "ATTACHED FILE 1" and "ATTACHED FILE 2") that are to be printed. Moreover, in the present example, the subject field of the message header includes two request identifiers each followed by a request.

In the example illustrated in FIG. 2, the request identifier is represented as a pound ("#"), but is to be understood that other request identifiers could be employed as well. Moreover, in some examples, requests can be extrapolated without the employment of a request identifier (e.g., from keywords and/or other syntax). Thus, in some examples, the print email message may not include the request identifier. Furthermore, in the example illustrated in FIG. 2, an attachment identifier (square brackets "[ ]") includes an ordinal number (labeled in FIG. 2 as "FIRST") designating a particular attached file, namely the first attached file, follows a first request identifier in the email message 50. In other examples, the file name of the attached file could be also/alternatively be employed. Moreover, two requests separated by a request delineator (illustrated in FIG. 2 as a slash "/") follow the attachment identifier, namely "DUPLEX" and "COLOR". Moreover, although the delineator is illustrated as being a slash ("/"), it is to be understood that in other examples, other characters (a comma, a space, etc.) could be employed in replacement of and/or in addition to the slash ("/"). A subject field decoration for a second attached file is also included. Thus, the subject field decoration can request that the first attached file (labeled in FIG. 2 as "FILE1.DOC") be printed in duplex mode and in color, and the subject field decoration can request that the second attached file (labeled in FIG. 2 as "FILE2.DOC") can be printed in duplex mode, in draft form and in black and white. In the present example, the requests are comprehendible by a user. However, in other examples, the requests could be encrypted, or otherwise unintelligible by the user.

In some examples, the request included in the email decoration can include a network resource formatted as a uniform resource identifier (URI). In such a situation, the network resource could be provided in identifiers such as square brackets ("[ ]"), quotation marks, curly brackets ("{ }"), etc. to ensure compatibility with the remaining portion of the email decoration.

Figure 3:
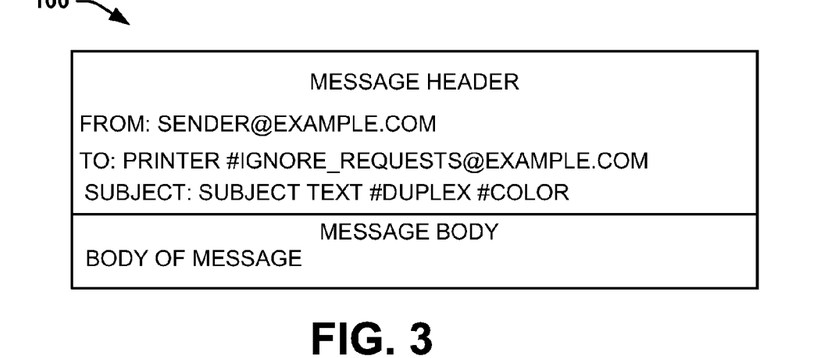
FIG. 3 illustrates an example of a print email message that includes an address field decoration.

FIG. 3 illustrates an example of a print email message 100 that includes an address field decoration. Similarly to FIG. 2, the print email message 100 illustrated in FIG. 3 includes a message header that includes a sender address field, a destination address field, a subject field and the print email message 100 can include a body that follows the message header. Moreover, in FIG. 3, the destination address field includes a request identifier ("#"), followed by a request. In some examples, a printer identifier before the request identifier in the address field can identify a particular printer, while text after the request identifier corresponds to requests for the identified printer. In the present example, the request (labeled in FIG. 3 as "IGNORE_REQUESTS") can be a request that all further requests (e.g., a request in a subject field decoration) throughout the print email message 100 be ignored. This may be desirable, for example, in situations where the subject field of the message header includes a request identifier due to unrelated circumstances (e.g., a message copied from another source inadvertently includes the request identifier), and an precise re-print of content is needed.

Figure 4:
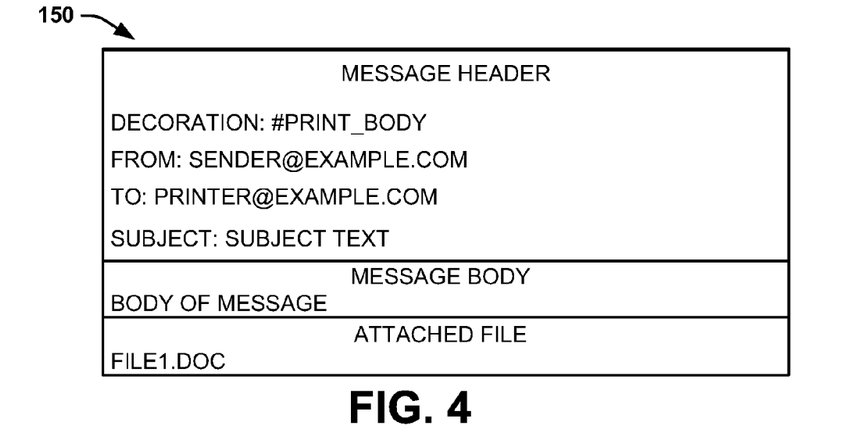
FIG. 4 illustrates an example of a print email message that includes a message header decoration.

FIG. 4 illustrates an example of a print email message 150 that includes a message header decoration (labeled in FIG. 4 as "DECORATION"), for example, as an optional field in a message header. Similarly to FIG. 2, the print email message 150 illustrated in FIG. 4 includes a message header having a sender address field, a destination address field, a subject field, and the print email message 150 can include a body and an attached file following the message header. The message header also includes a request following a request identifier ("#") of "PRINT_BODY." As one example, the PRINT_BODY can be a request that the identified printer print the body of the print email message 150 (labeled in FIG. 4 as "BODY OF MESSAGE").

Figure 5:
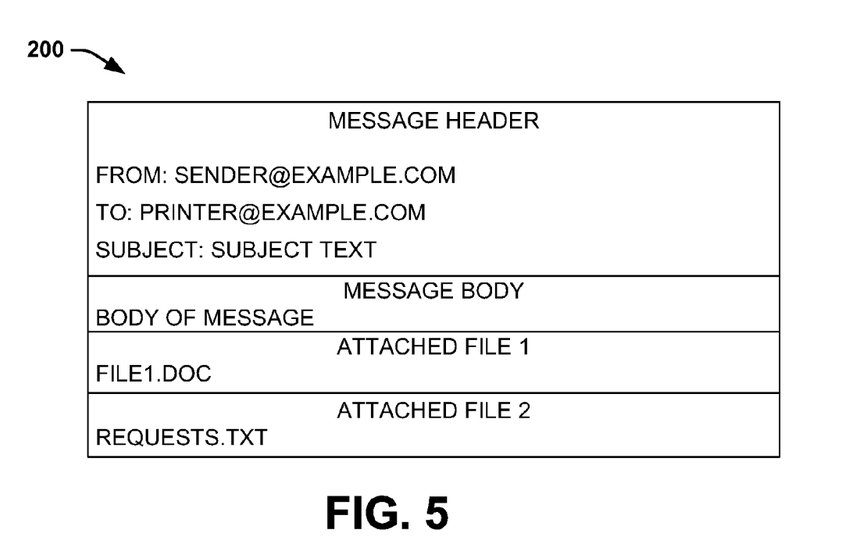
FIG. 5 illustrates an example of a print email message that includes a body decoration.

FIG. 5 illustrates an example of a print email message 200 with a body decoration, which can be referred to as a print tag. Similarly to FIG. 2, the print email message 200 illustrated in FIG. 5 includes message header that includes a sender address field, a destination address field, a subject field, and the print email message 200 can include a body and a first attached file (labeled in FIG. 5 as "FILE1.DOC") following the message header. The print email message 200 also includes a second attached file, which can be referred to as a request file (labeled in FIG. 5 as "REQUESTS.TXT") that contains requests. In some examples, the name of the file can include a description of the first attached file (e.g., REQUESTS_PHOTO.TXT, REQUESTS_LEAN.TXT, etc.). In other examples, request files could be assigned to attachments by employing address and/or subject field decorations.

Figure 6:
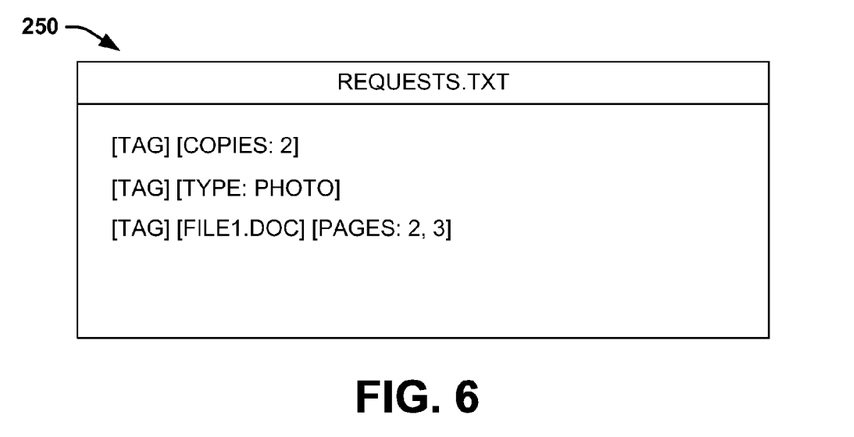
FIG. 6 illustrates an example of a request file.

FIG. 6 illustrates an example of a request file 250 that could be employed as the request file described with respect to FIG. 5. In FIG. 6, a request identifier is followed by a request. In the example illustrated in FIG. 6, the request identifier is implemented as square brackets that contain text, specifically "[TAG]." In other examples, other request identifiers could be employed, such as a slash ("/") to denote requests and or arguments for requests. Moreover, in FIG. 6, three different requests are also included in square brackets. A first request, (labeled in FIG. 6, as [COPIES: 2]) can request that a particular number of copies be printed. A second request (labeled in FIG. 6, as [TYPE: PHOTO]) can request that a particular quality (e.g., photographic quality) be employed for the printing. A third request (labeled in FIG. 6, as [FILE1.DOC] [PAGES: 2, 3]) can request that only pages 2 and 3 of a particular attached file ("FILE1.DOC") be printed. Additionally or alternative, other syntax could be employed. For instance, in some examples, a pound ("#") slash ("/") notation could be employed. In such a situation, syntax similar to that which is illustrated in FIGS. 2-5 could be employed. Employment of a request file 250 may be desirable, for instance, in situations wherein repeatability of printing parameters is needed and/or a complicated series of requests is needed. Referring back to FIG. 5, additionally or alternatively in other examples, the text in the request file 250 could be implemented as part of the body of the print email message 200 (labeled in FIG. 5 as "BODY OF MESSAGE").

Referring back to FIG. 1, the printer server 14 can receive the print email message and process the print email message in a manner described herein. In such an example, the printer 4 can be assigned a unique email address, such that the printer server 14 can receive a print email message destined for a given unique email address of the printer 4. Moreover, in some examples, such as where an address field decoration is employed, the printer server 14 and/or the email server 17 can ignore the decoration portion of the email address field decoration when determining an identification of the printer 4. In some examples, the email server 17 can facilitate processing of the print email message. For instance, if an address field decoration is employed, the email server 17 could be designed to process the email decoration included in the message envelope before the message is forwarded to the printer server 14, in a manner described herein. For instance, if an address field decoration is employed, email server 17 can be designed to identify a mailbox associated with the decorated address field of the message envelope before the print email message is provided to the printer server 14. To identify the mailbox, the email server 17 could, for example, examine only characters preceding a request identifier. Furthermore, in some examples, the email server 17 can create the message envelope with the recipient address field (of the message envelope) modified to remove the address field decoration, such that the recipient address field of the message envelope is the true email address of the recipient. In such a situation, the message envelope and the header of the email message can have different email addresses, namely an undecorated email address and a decorated email address.

By utilizing such the network system 2, the client computer 16, from which the print email message originated need not include a driver for the printer 4, although the client computer 16 is not prohibited from including such a driver. Instead, the client computer 16 needs only to include an email client 18 (e.g., an MUA) capable of sending and receiving emails from a user 20 of the client computer 16. Accordingly, the client computer 16 can be implemented as nearly any computer that can communicate over the network 6, including but not limited to a desktop or laptop personal computer, a mobile device, such as a smartphone, a personal digital assistant (PDA), etc. Furthermore, since a request for printing is sent via email, physical and logical routing distance between the client computer 16 and the printer 4 is immaterial. That is, the client computer 16 and the printer 4 can be coupled to the same local area network (LAN) or coupled by a wide area network (WAN).

The printer server 14 can include an email analyzer 22 that can process a print email message destined for the printer 4. The email analyzer 22 can parse the print email message to determine if an email decoration is present in the print email message. The email decoration can be recognized, for example, by a request identifier being present in the print email message. If no request identifier is present in the print email message, the printer server 14 can generate a print job for the printer 4 by converting a file attached to the print email message and/or some portion of the print email message into a set of commands and providing the set of commands in an instruction message that causes the printer 4 to print a print job.

If an email decoration is present in the print email message, the email analyzer 22 can analyze a request and attempt to identify a request specified in the email decoration. In some examples, different requests can perform the same functions. For instance, a request of "duplex" can performed the same function as a request of "two-sided." Moreover, the email analyzer 22 can be designed to accommodate common misspellings of the request (e.g., spelling "two-sided" as "tow-sided"). In such a situation, the email analyzer 22 can simply choose the most likely intended request. In other examples, if a request is not recognized, the email analyzer 22 can send the user 20 a clarification email message indicating that the request is not understood and a likely intended request. In such a situation, the user 20 can reply to the clarification email message indicating that the likely intended request was in fact the intended request, wherein the email analyzer 22 can employ the reply to the clarification to expand the available list of requests.

In some examples, the email analyzer 22 can execute a request based on the email decoration. For instance, in situations where the email decoration does not request that a document be printed, but instead requests a change in status of the printer 4 and/or a change in a method for responding to print email messages, the email analyzer 22 can execute the request without generating a print job, such that execution of the request affects other (future) print jobs. Moreover, in examples where execution of the print job is desired, the email analyzer 22 can also determine if the printer 4 is capable of executing a print job generated based on the request. For instance, if the request specifies that a file attached to the print email message should be printed with A4 size paper, the email analyzer 22 and/or the printer server 14 can analyze the capabilities of the printer 4 to determine, (i) if the printer 4 can print to A4 size paper, and (ii) if the printer 4 has A4 size paper loaded in a paper carriage. If the email analyzer 22 determines that the printer 4 cannot execute a print job that follows the request set forth in the print email message, the email analyzer 22 and/or the printer server 14 can provide a denial email message to the client computer 16 that indicates that a requested print job cannot be completed, and the reason that the print job cannot be completed. Moreover, in some examples, the denial email message can include an actuatable feature (e.g., hyperlinks, virtual buttons, etc.) that could allow the user to initiate execution of the print job with a modified parameter (e.g., a different paper size). For instance, in a situation where the request set forth in the print email message requests that the printer 4 print on size A4 paper, but the printer 4 only supports 8.5×11 inch paper, the actuatable functions could include options to execute the print job in a scaled down or reflowed format on 8.5×11 inch paper. In another example, in a situation where the request set forth in the print email message requests that the printer 4 print in duplex mode, but the printer 4 can only print on one side of paper, the actuatable functions could include options to execute the print job in a one-sided format.

If the email analyzer 22 determines that the printer 4 can execute a print job that follows the request set forth in the print email message, the printer server 14 can convert a file attached to the print email message and/or a portion of the print email message into a set of commands in a printing protocol, wherein the set of commands are consistent with the request included in the email decoration. The printer server 14 can provide an instruction message that includes the set of commands to the printer 4 thereby causing the printer 4 to process a print job and to print in accordance with the request set forth the in the email decoration. In some examples, upon completing the printing, the printer 4 can send a completion message to the printer server 14 indicating that the printing has been completed. In such a situation, the printer server 14 can send the user 20 a confirmation email message (by utilizing a sender address field of the print email message) that indicates that a print job was completed consistent with the request set forth in the email decoration. In another example, if the printer 4 begins to print in response to the instruction message but encounters an error before the completion of the printing (e.g., runs out of paper), the printer 4 can return a failure message to the printer server 14 that indicates that printing has not been completed, and the reason that the printer 4 has not completed the printing. In response to the failure message, the printer server 14 can provide an error message to the user 20 (by utilizing a sender address field of the print email message) that indicates that the file attached the print email message has failed to print, and the reason for the failure. In this manner, the user 20 can remedy the situation (e.g., fill a paper tray of the printer 4), and the printer 4 can resume printing.

By utilizing the network system 2, the user 20 of the client computer 16 can customize print jobs that are initiated via email. Accordingly, the network system 2 provides a great deal of flexibility in providing customize print jobs based on individual users' needs.

Figure 7:
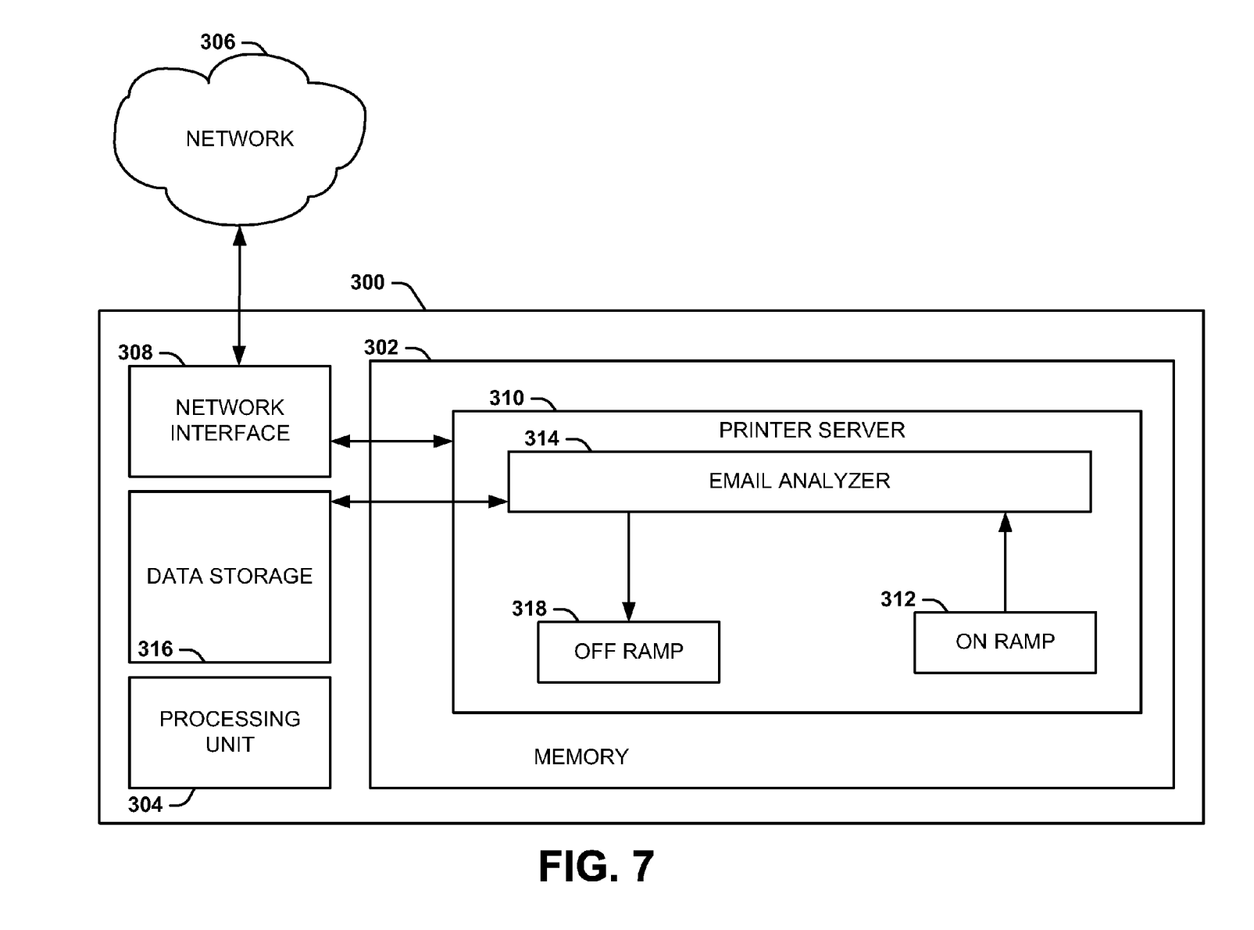
FIG. 7 illustrates an example of a printing system for managing a print job.

FIG. 7 illustrates an example of a printing system 300 that can be utilized to implement, for example, the printing system 8 illustrated in FIG. 1. The printing system 300 can include a memory 302 for storing computer executable instructions. The memory 302 could be implemented, for example, as random access memory, flash memory, a hard disk, a combination thereof, etc. The printing system 300 can also include a processing unit 304 that can access the memory 302 and executes computer executable instructions. The processing unit 304 can be implemented, for example, a processor core.

The printing system 300 can be coupled to a network 306 (e.g., the Internet) via a network interface 308, which could be implemented as a network interface card. The memory 302 can include a printer server 310 that can manage printing jobs.

The printer server 310 can include an on ramp 312 that receives an email message with an attached file to be printed, which can be referred to as a print email message. The on ramp 312 can provide the print email message to an email analyzer 314 of the printer server 310. The email analyzer 314 can evaluate the destination address field (e.g., addressee) of the print email message and retrieve a printer record from a data storage 316 of the printing system 300 associated with the destination address field of the print email message, wherein the printer can be referred to as an identified printer. The data storage 316 can include, for example, a database and/or a table that can store the printer record. The data storage 316 can be implemented, for example as volatile memory (e.g., RAM) or non-volatile memory (e.g. a hard disk and/or a flash drive). The printer record can include, for example, data (e.g., a white list) that identifies a list of users and/or email addresses authorized to print to the identified printer. The printer record can also include routing information (e.g., a network address) of the identified printer. The printer record can further include data that characterizes printing capabilities of the identified printer. Moreover, in some examples, the email analyzer 314 can examine the sender address field of the print email message and the print record to determine if the sender of the print email has authority to print to the identified printer. The email analyzer 314 can parse the print email message and the file attached to the print email message and to determine if an email decoration is present in the print email message. The email decoration can include a request identifier and a request following and/or preceding the request identifier.

In some examples, the email analyzer 314 can execute a request based on the request included in the email decoration, such as examples where no print job is requested and/or examples wherein multiple email decorations are included and at least one request can be executed before generation of a print job. Moreover, in examples where the request cannot be identified, the email analyzer 314 can provide a clarification email to a sender of the print email message, requesting that the intent of the email decoration be clarified. If a response to the clarification email is received by the email analyzer 314, the email analyzer 314 can utilize the response to expand a set of recognizable requests.

The email analyzer 314 can examine the capabilities of the identified printer to determine if a print job can be executed on the identified printer consistent with the command set forth in the print email message. If the email analyzer 314 determines the that the print job cannot be executed by the identified printer, the email analyzer 314 can generate a denial email message that explains that the print job will not be executed, and the reason for not executing the print job (e.g., the identified printer cannot print in color), and provide the denial email message to a sender of the print email message. Conversely, if the identified printer can execute the print job, the email analyzer 314 can forward the print email message and the email decoration to an off ramp 318 of the printer server 310.

In response, the off ramp 318 can query the identified printer to determine if the identified printer currently has the capability of executing the print job (e.g., paper loaded at the identified printer). If the off ramp 318 determines that the identified printer does not have the current capability of executing the print job, the off ramp 318 can generate and provide a denial email message to a sender of the print email message in a manner similar to the denial message described with respect to the email analyzer 314. If the off ramp 318 determines that the identified printer does have the current capabilities to execute the print job, the off ramp 318 can convert a file attached to the print email message, and/or a portion of the print email message into a set of commands in a protocol native to the identified printer (e.g., PCL, PDF, HPGL, etc.) consistent with the command set forth in the email decoration. In some examples, the off ramp 318 can access external systems (e.g., web services) to facilitate the generation of the set of commands. The off ramp 318 can send the set of commands as an instruction message to the identified printer over the network 306, thereby causing the identified printer to process the set of commands. The processing of the set of commands can result, for example, in an execution of the print job. The execution of the print job can include, for example, printing the file attached to the print email message and/or a portion of the print email message in a manner consistent with the command set forth in the email decoration.

The off ramp 318 can receive a status message from the identified printer. The status message could be implemented, for example as a completion message or a failure message, as described herein with respect to FIG. 1. In response to the status message, the off ramp 318 can provide an update email message to the sender of the print email message. The update email message can be implemented, for example, as a confirmation email message or an error email message, as described herein. Thus, the update message provides the sender of the print email message an indication of a status of the print job corresponding to the execution of a print job requested by the print email message.

Figure 8:
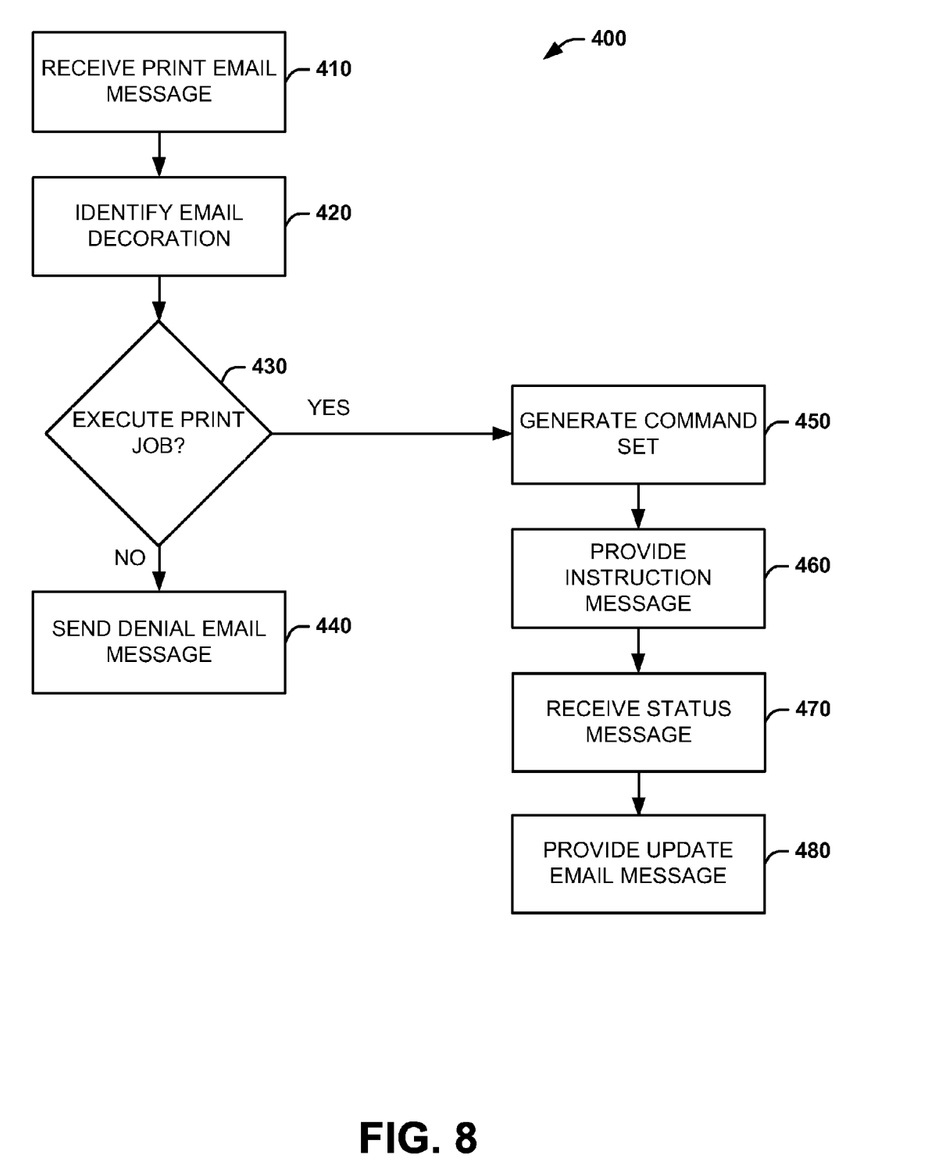
FIG. 8 illustrates an example of a flow chart of a method for managing a print job.
Figure 9:
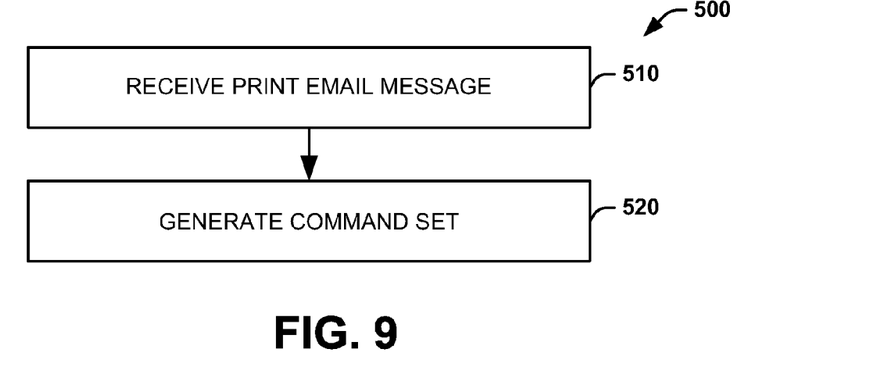
FIG. 9 illustrates another example of a flowchart of a method for managing a print job.

In view of the foregoing structural and functional features described above, example methods will be better appreciated with reference to FIGS. 8-9. While, for purposes of simplicity of explanation, the example methods of FIGS. 8-9 are shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method.

FIG. 8 illustrates a flow chart of an example method 400 for managing a print job. The method 400 could be executed, for example, by a printing system (e.g., the network system 2 illustrated in FIG. 1 and/or the printing system 300 illustrated in FIG. 7). At 410, a print email message can be received at a printer server of the printing system. The print email message can include an attached file to be printed. At 420, an email decoration can be identified in the print email. The email decoration can include, for example, a request identifier and a command. At 430, a determination is made as to whether a printer identified in a destination address field of the print email message, which can be referred to as an identified printer, can execute a print job based on the email decoration. If the determination at 430 is negative (e.g., NO), the method 400 proceeds to 440. If the determination is positive (e.g., YES), the method 400 proceeds to 450. At 440, a denial email message is provided to the sender of the print email message. The denial email message can indicate that the file attached to the print email message has not been printed, and can also include a reason for not printing the file attached to the print email message (e.g., the identified printer does not support size of paper identified in the command, the identified printer is out of paper, etc.).

At 450, a command set can be generated based on the email decoration. In some examples, the command set can be employed to implement a specific print job. In such a situation, the file attached to the print email message and/or a portion of the print email message can be converted, by the printer server, into a set of commands in a protocol native to the printer (e.g., PCL, PDF, HGPL, etc.) consistent with the request set forth in the email decoration. In other examples, the command set can be executed by a printer server (and/or email analyzer) without and/or in addition the execution of a print job. At 460, an instruction message including the commands can be provided to the identified printer from the printer server. At 470, the printer server can receive a status message from the identified printer. The status message can indicate whether the print job has been executed. At 480, the printer server can provide an update email to the sender of the print email message based on information in the status message. By utilization of the method 400, a user of a client system (e.g., the sender of the print email message) can tailor printing preferences of a print job requested via email. Accordingly, the client system can leverage full printing capabilities of the identified printer without the need for installation of a printer driver for the identified printer at the client computer.

FIG. 9 illustrates another flowchart of an example method 500 for managing a print job. At 510, a print email message that includes an email decoration can be received. The email decoration can specify printing parameters. At 520, a request set consistent with the email decoration for a printer associated with a destination address field of the print email message can be generated.

Figure 10:
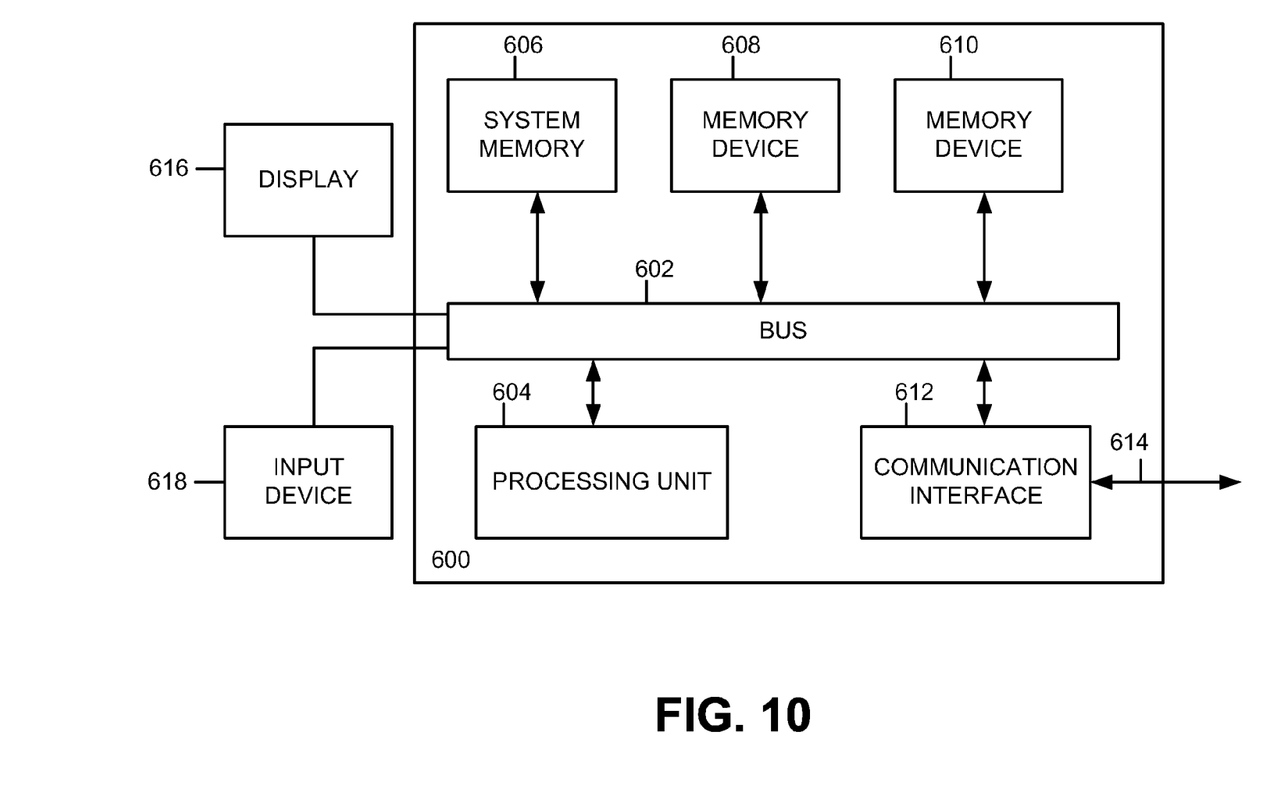
FIG. 10 illustrates an example of a computer system that can be employed to implement the systems and methods illustrated in FIGS. 1-9.

FIG. 10 is a schematic block diagram illustrating an example system 600 of hardware components capable of implementing examples disclosed in FIGS. 1-8, such as the printing system 8, the client computer 16, and portions of the of printer 4 illustrated in FIG. 1 and/or the printing system 300 illustrated in FIG. 7. The system 600 can include various systems and subsystems. The system 600 can be a personal computer, a laptop computer, a workstation, a computer system, an appliance, an application-specific integrated circuit (ASIC), a server, a server blade center, a server farm, a mobile device, such as a smart phone, a personal digital assistant, etc.

The system 600 can include a system bus 602, a processing unit 604, a system memory 606, memory devices 608 and 610, a communication interface 612 (e.g., a network interface), a communication link 614, a display 616 (e.g., a video screen), and an input device 618 (e.g., a keyboard and/or a mouse). The system bus 602 can be in communication with the processing unit 604 and the system memory 606. The additional memory devices 608 and 610, such as a hard disk drive, server, stand alone database, or other non-volatile memory, can also be in communication with the system bus 602. The system bus 602 operably interconnects the processing unit 604, the memory devices 606-610, the communication interface 612, the display 616, and the input device 618. In some examples, the system bus 602 also operably interconnects an additional port (not shown), such as a universal serial bus (USB) port.

The processing unit 604 can be a computing device and can include an application-specific integrated circuit (ASIC). The processing unit 604 executes a set of instructions to implement the operations of examples disclosed herein. The processing unit can include a processor core.

The additional memory devices 606, 608 and 610 can store data, programs, instructions, database queries in text or compiled form, and any other information that can be needed to operate a computer. The memories 606, 608 and 610 can be implemented as computer-readable media (integrated or removable) such as a memory card, disk drive, compact disk (CD), or server accessible over a network. In certain examples, the memories 606, 608 and 610 can comprise text, images, video, and/or audio.

Additionally, the memory devices 608 and 610 can serve as databases or data storage such as the data storage 316 illustrated in FIG. 7. Additionally or alternatively, the system 600 can access an external system (e.g., a web service) through the communication interface 612, which can communicate with the system bus 602 and the communication link 614.

In operation, the system 600 can be used to implement, for example, a client computer, a printer server, and at least some components of printers the can be employed in a system that manages a print job. Computer executable logic for implementing the system, such as the memory 10 of the printing system 8 illustrated in FIG. 1 and or the printing system 300 illustrated in FIG. 7, can reside in the system memory 606, and/or in the memory devices 608 and/or 610 in accordance with certain examples. The processing unit 604 executes one or more computer executable instructions originating from the system memory 606 and the memory devices 608 and 610. In such an example, the system memory 606 and/or the memory devices 608 and/or 610 could be employed, for example, to implement the memory 10 illustrated in FIG. 1 and/or the memory 302 illustrated in FIG. 7. The term "computer readable medium" as used herein refers to a medium that participates in providing instructions to the processing unit 604 for execution.

Where the disclosure or claims recite "a," "an," "a first," or "another" element, or the equivalent thereof, it should be interpreted to include one or more than one such element, neither requiring nor excluding two or more such elements. Furthermore, what have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

What is claimed is:

1. A network system for managing a print job comprising:
   a printing system comprising:
   a memory for storing computer executable instructions, wherein the memory comprises a non-transitory computer readable medium; and
   a processing unit for accessing the memory and executing the computer executable instructions, the computer executable instructions comprising:
   a printer server to:
   generate a print job for a printer based on a received print email message, wherein the print job is generated based on an email decoration incorporated into a destination address field of a header of the print email message, the email decoration including a request specifying printing parameters for the print job, wherein the print email message includes content to be printed by the printer during execution of the print job;
   provide instructions for executing the print job to the printer via a network; and
   send a denial email message to the client computer in response to determining that the printer does not have the capability to comply with the request included in the email decoration.

2. The network system of claim 1, wherein the printer server further comprises an email analyzer to parse the print email message to identify the email decoration.

3. The network system of claim 1, wherein the email decoration includes a request identifier and a request.

4. The network system of claim 3, wherein at least a portion of the request is comprehendible by a user.

5. The network system of claim 1, wherein the email decoration is not incorporated into a destination address field of an envelope generated for the print email message.

6. The network system of claim 1, wherein the email decoration is a first email decoration, and the print email message comprises a second email decoration, wherein the first email decoration includes a request to affect the interpretation of the second email decoration.

7. The network system of claim 1, wherein the email decoration identifies a network resource and/or service that provides content to be printed in the print job.

8. The network system of claim 1, wherein the denial email comprises an actuatable feature for initiating execution of the print job with a modified parameter.

9. The network system of claim 1, wherein the email decoration specifies a user authorized to print to a particular printer, and wherein the printer server is further to add the user specified in the email decoration to a white list, wherein the white list contains a list of users that are authorized to print to the particular printer.

10. The network system of claim 1, wherein the email decoration specifies that a user is not authorized to print to a particular printer, and wherein the printer server is further to add the user specified in the email decoration to a black list, wherein the black list contains a list of users that are not authorized to print to the particular printer.

11. The network system of claim 1, wherein the email decoration includes a request that at least one of indicates that only users identified on a white list is permitted to print to a printer, specifies that default settings of a printer be changed, requests a list of available requests employable in an email decoration be provided, and requests that a list of stored print jobs be printed.

12. A method for managing a print job comprising:
receiving a print email message that includes an email decoration, the email decoration specifying printing parameters for a print job, wherein the print email message includes content to be printed at a printer during execution of the print job, and wherein the email decoration is incorporated into a destination address field of a header of the print email message;
analyzing the print email message to determine whether the printer has the capability to comply with the request included in the email decoration; and
sending a denial email message to the client computer in response to determining that the printer does not have the capability to comply with the request included in the email decoration.

13. The method of claim 12, wherein the email decoration specifies a method of providing a response to the print email message.

14. The method of claim 12, wherein the denial email comprises an actuatable feature for initiating execution of the print job with a modified parameter.

15. The method of claim 12, wherein the print email message is a given print email message, the method further comprising:
receiving another print email message that includes an email decoration, the email decoration of the another print email message specifying printing parameters for a print job, wherein the another print email message includes content to be printed at the printer during execution of the print job;
analyzing the another print email message to determine whether the printer has the capability to comply with the request included in the email decoration of the another print email message;
generating a command set to execute the print job consistent with the email decoration of the another print email message for the printer associated with a destination address field of a header of the another print email message in response to determining that the printer has the capability to comply with the request included in the email decoration of the another print email message; and
providing the command set to the printer via a network.

16. The method of claim 12, wherein the email decoration specifies a user authorized to print to a particular printer, said method further comprising:
adding the user specified in the email decoration to a white list, wherein the white list contains a list of users that are authorized to print to the particular printer.

17. The method of claim 12, further comprising:
generating a command set to execute the print job consistent with the email decoration for the printer associated with a destination address field of a header of the print email message in response to determining that the printer has the capability to comply with the request included in the email decoration; and providing the command set to the printer via a network.

18. A system for managing a print job comprising:
a printing system coupled to a network, the printing system comprising:
a memory for storing computer executable instructions, wherein the memory comprises a non-transitory computer readable medium; and
a processing unit for accessing the memory and executing the computer executable instructions, the computer executable instructions comprising:
a printer server to receive a print email message provided from an email client of a client computer, the printer server comprising:
an email analyzer to parse the print email message, the email analyzer to identify an email decoration in the print email message;
wherein the printer server is further to generate a command set for a printer associated with a destination address field a header of the print email message, such that the command set is consistent with a request included in the email decoration;
wherein the email decoration is incorporated into the destination address field of the header of the print email message, the email decoration comprising:
a request identifier; and
a request that characterizes a printing parameter;
wherein the email analyzer is further to send a denial email message to the client computer in response to determining that the printer does not have the capability to comply with the request included in the email decoration, the denial email comprising an actuatable feature for initiating execution of the print job with a modified parameter.

19. The system of claim 18, wherein the email decoration specifies a user authorized to print to a particular printer, and wherein the printer server is further to add the user specified in the email decoration to a white list, wherein the white list contains a list of users that are authorized to print to the particular printer.

20. A network system for managing a print job comprising:
a printing system comprising:
a memory for storing computer executable instructions, wherein the memory comprises a non-transitory computer readable medium; and a processing unit for accessing the memory and executing the computer executable instructions, the computer executable instructions comprising:
a printer server to:
generate a print job for a printer based on a received print email message, wherein the print job is generated based on an email decoration incorporated into a destination address field of a header of the print email message, the email decoration including a request specifying printing parameters for the print job, wherein the print email message includes content to be printed by the printer during execution of the print job; and
provide instructions for executing the print job to the printer via a network.

21. The network system of claim 20, wherein the email decoration specifies a user authorized to print to a particular printer, and wherein the printer server is further to add the user specified in the email decoration to a white list, wherein the white list contains a list of users that are authorized to print to the particular printer.

* * * * *